United States Patent
Yamamoto et al.

(10) Patent No.: US 9,846,403 B2
(45) Date of Patent: Dec. 19, 2017

(54) ELECTRIC POWER SUPPLY DEVICE AND IMAGE FORMING APPARATUS INCLUDING SUCH AN ELECTRIC POWER SUPPLY DEVICE

(71) Applicants: Naohiro Yamamoto, Kanagawa (JP); Shoji Kuriki, Kanagawa (JP)

(72) Inventors: Naohiro Yamamoto, Kanagawa (JP); Shoji Kuriki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/110,874

(22) PCT Filed: Jan. 5, 2015

(86) PCT No.: PCT/JP2015/050418
§ 371 (c)(1),
(2) Date: Jul. 11, 2016

(87) PCT Pub. No.: WO2015/107980
PCT Pub. Date: Jul. 23, 2015

(65) Prior Publication Data
US 2016/0342128 A1 Nov. 24, 2016

(30) Foreign Application Priority Data

Jan. 15, 2014 (JP) .................................. 2014-005162
Jan. 21, 2014 (JP) .................................. 2014-008982

(51) Int. Cl.
*G03G 15/00* (2006.01)
*G03G 15/20* (2006.01)
*H02J 7/34* (2006.01)
*H02J 1/04* (2006.01)
(Continued)

(52) U.S. Cl.
CPC ......... *G03G 15/80* (2013.01); *G03G 15/2039* (2013.01); *H02J 1/00* (2013.01);
(Continued)

(58) Field of Classification Search
CPC ......... G03G 2215/00983; G03G 15/80; G03G 15/2039; H02J 3/32
(Continued)

(56) References Cited

U.S. PATENT DOCUMENTS 6,542,705 B2   4/2003   Fujita et al.
7,257,341 B2   8/2007   Hanamoto et al.
(Continued)

FOREIGN PATENT DOCUMENTS

JP   2002-174988   6/2002
JP   2004-236492   8/2004
(Continued)

OTHER PUBLICATIONS

International Search Report dated Mar. 31, 2015 in PCT/JP2015/050418 filed on Jan. 5, 2015.

*Primary Examiner* — Sandra Brase
(74) *Attorney, Agent, or Firm* — Oblon, McClelland, Maier & Neustadt, L.L.P.

(57) ABSTRACT

An electric power supply device includes a first electric power supply to employ electric power supplied from outside as an input source; a second electric power supply to employ a rechargeable battery as an input source; a load electric power supply part to supply electric power to a constant voltage load; a heater electric power supply part to supply electric power to a heater; a DC internal bus to connect the first electric power supply, the second electric power supply, the load electric power supply part, and the heater electric power supply part; and a controller to control an output of the second electric power supply. The controller controls electric power supply from the second electric power supply to the DC internal bus based on a voltage of the DC internal bus.

21 Claims, 11 Drawing Sheets

(51) Int. Cl.
*H02J 9/06* (2006.01)
*H02J 1/00* (2006.01)
*H02J 3/32* (2006.01)
*H02J 7/00* (2006.01)

(52) U.S. Cl.
CPC .................. *H02J 1/04* (2013.01); *H02J 3/32* (2013.01); *H02J 7/0068* (2013.01); *H02J 7/34* (2013.01); *H02J 9/062* (2013.01); *G03G 2215/00983* (2013.01); *H02J 7/345* (2013.01)

(58) Field of Classification Search
USPC ........................................ 399/88, 67, 69, 70
See application file for complete search history.

(56) References Cited

U.S. PATENT DOCUMENTS

| | | | |
|---|---|---|---|
| 7,629,780 B2 | 12/2009 | Ogawa | |
| 7,949,885 B2 * | 5/2011 | Kikuchi | G06F 1/30 399/37 |
| 8,457,505 B2 | 6/2013 | Mochizuki | |
| 2006/0237446 A1 * | 10/2006 | Kishi | G03G 15/2039 219/619 |
| 2007/0097577 A1 | 5/2007 | Peng et al. | |
| 2008/0224540 A1 * | 9/2008 | Sugawara | G03G 15/80 307/46 |

FOREIGN PATENT DOCUMENTS

| | | |
|---|---|---|
| JP | 2005-050587 | 2/2005 |
| JP | 2005-221677 | 8/2005 |
| JP | 2007-124787 | 5/2007 |
| JP | 2007-166765 | 6/2007 |
| JP | 2007-209149 | 8/2007 |
| JP | 2008-039842 | 2/2008 |
| JP | 2008-278680 | 11/2008 |
| JP | 2008-292947 | 12/2008 |
| JP | 2010-088273 | * 4/2010 |
| JP | 2011-053400 | 3/2011 |

* cited by examiner

ELECTRIC POWER SUPPLY DEVICE AND IMAGE FORMING APPARATUS INCLUDING SUCH AN ELECTRIC POWER SUPPLY DEVICE

TECHNICAL FIELD

The disclosures discussed herein relate to an electric power supply device and an image forming apparatus including such an electric power supply device.

BACKGROUND ART

In image formation apparatuses, attempts have been made to reduce a startup period. It is necessary to supply a lot of electric power to a fixing device to achieve the reduction of a startup period successfully. However, the maximum suppliable electric power is generally limited in commercially available AC power supplies. Hence, in the related art image forming apparatuses, a capacitor or a rechargeable battery is provided with the image forming apparatus to temporarily supply high power from the rechargeable battery and the commercially available AC power supply to the fixing device simultaneously. This made it possible to reduce a warmup time of the fixing device, which results in the reduction in the startup period of the image forming apparatus.

However, in this related art method, it is necessary to control the electric power supply to the fixing device in accordance with a power control status of the power supplied to loads other than the fixing device in order not to allow electric power supply from the commercially available AC power supply to exceed the maximum electric power (the limit value). Thus, it is necessary to provide some unit for monitoring the power supply status of the power supplied to the loads other than the fixing device.

For example, Patent Document 1 (Japanese Laid-open Patent Publication No. 2005-221677) discloses an image forming apparatus provided with an electric power supply device capable of controlling electric power supplied to a fixing device to shorten the warmup time. In this technology, the electric power supply device is capable of restricting the electric power supplied from the commercially available power supply to a predetermined limit level. The electric power supply device of this image forming apparatus includes an electric power supply circuit to output electric power by reducing an alternating current voltage of the commercially available power supply to a predetermined direct current voltage. Hence, driving loads other than a heater of the fixing device may receive electric power from the commercially available power supply and/or a rechargeable battery. The power supply from the commercially available power supply and the rechargeable battery serving as the power supply to the driving loads when printing are such that the electric power supply from the commercially available power supply to the fixing device is restricted to the limit level based on the above-described control result.

However, the power supply status of the power supplied to the loads other than the fixing device is also required in this image forming apparatus in order to control the electric power from the commercially available power supply to the limit level.

Meanwhile, there are widely known in the art electric power supply devices that feed electric power to apparatuses by switching a main power supply and an auxiliary power. For example, Patent Document 2 (Japanese Laid-open Patent Publication No. 2007-209149) discloses an electric power supply device that includes a first power supply configured to output a constant voltage using electric power supplied from outside as an input source, and a second power supply using a rechargeable device and electric power of the rechargeable device as an input source so as to simultaneously supply electric power from the first power supply and electric power from the second power supply.

In the related art electric power supply device disclosed in Patent Document 2, the output of the second power supply is controlled based on the output current value of the first power supply. That is, the output current value of the first power supply is detected first, and electric power is supplied from the second power supply such that the detected output current value is a certain upper limit current value or less. In this manner, the rechargeable device may supply part of the electric power used by a constant voltage load. A fixing power supply of the electric power supply device uses an AC power source supplied from outside as an input source to supply AC power to cause the fixing heater to be conductive via fixing power instruction signals, which causes the fixing heater to generate heat.

It is generally known in the art that the maximum value of the electric power to heat the fixing heater exceeds electric power used by the constant voltage load. For example, the electric power used by the constant voltage load is approximately 600 W, and the maximum electric power for heating the fixing heater is set at 900 W. On the other hand, the above related art electric power supply device uses the AC power supply supplied from outside as an input source of the fixing power supply. Thus, the electric power supply device may fail to level the fixing power supply that consumes the electric power greater than the constant voltage load.

Further, the related art electric power supply device may cover the electric power for the constant voltage load with the electric power from the rechargeable battery alone; however, the fixing power supply uses the externally supplied AC power supply as the input source. Hence, all the electric power will not be covered by the electric power supplied from the rechargeable battery. Hence, the related art electric power supply device may fail to serve as a backup function when the external power supply is cut off such as during an electrical outage.

SUMMARY OF THE INVENTION

Problems to be Solved by the Invention

Accordingly, it is a general object in one embodiment of the present invention to provide an electric power supply device and an image forming apparatus including such an electric power supply device provided with an electric power supply (a first electric power supply) using electric power supplied from outside as an input source and an electric power supply (a second electric power supply) using an output of a rechargeable battery as an input source capable of controlling electric power supply from the second electric power supply to allow the maximum electric output power value to a predetermined limit level or lower without monitoring electric power supply status of the electric power supplied to loads other than a heater that substantially obviate one or more problems caused by the limitations and disadvantages of the related art.

Further, it is an object in another embodiment to provide an electric power supply device and an image forming apparatus capable of leveling externally supplied electric power to a first threshold or less that substantially obviate one or more problems caused by the limitations and disadvantages of the related art.

Means for Solving the Problems

According to an aspect of the present invention, there is provided an electric power supply device that includes a first electric power supply configured to employ electric power supplied from outside as an input source; a second electric power supply configured to employ a rechargeable battery as an input source; a load electric power supply part configured to supply electric power to a constant voltage load; a heater electric power supply part configured to supply electric power to a heater; a DC internal bus configured to connect the first electric power supply, the second electric power supply, the load electric power supply part, and the heater electric power supply part; and a controller configured to control an output of the second electric power supply. In the electric power supply device, the controller controls electric power supply from the second electric power supply to the DC internal bus based on a voltage of the DC internal bus.

Effects of the Present Invention

According to first to third embodiments, the maximum electric power value supplied from the first electric power supply to the load other than the heater may be controlled to be lower than or equal to the predetermined limit level without monitoring the power supply status by controlling electric power supplied from the second power supply.

According to fourth to seventh embodiments, the external input power may be leveled to the first threshold or less.

BEST MODE FOR CARRYING OUT THE INVENTION

In the following, embodiments of the present invention are described with reference to the accompanying drawings.

Figure 1:
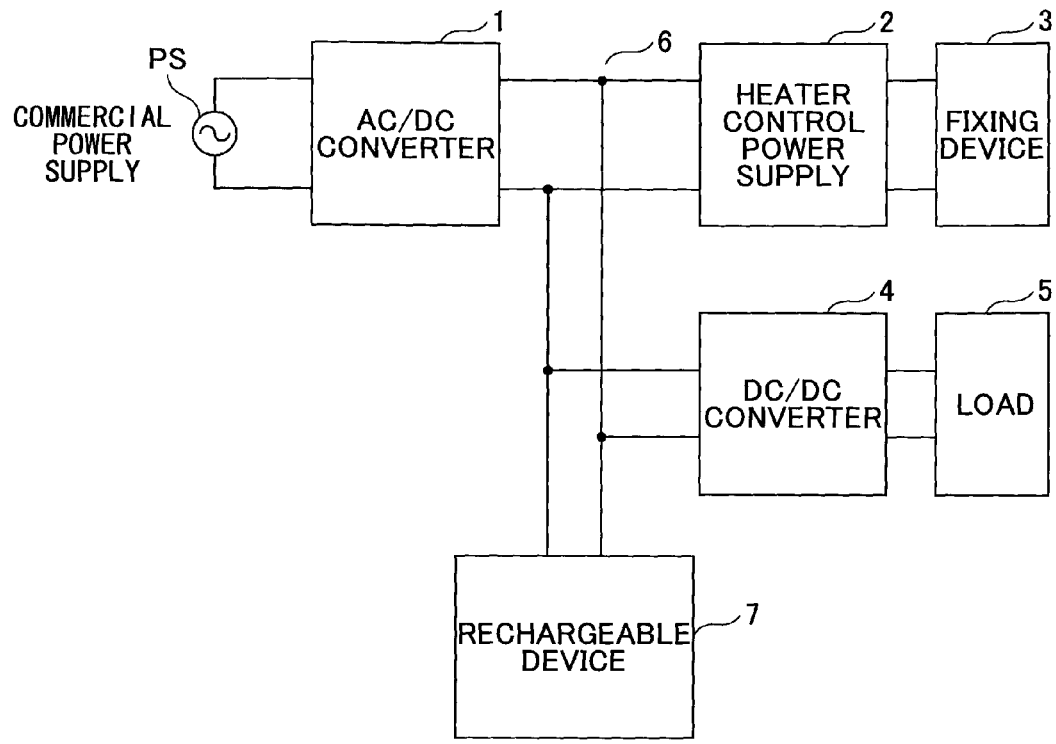
FIG. 1 is a block diagram schematically illustrating a configuration of an electric power supply device in common with embodiments.

FIG. 1 is a block diagram schematically illustrating a configuration of an electric power supply device in common with embodiments. As illustrated in FIG. 1, an electric power supply device of the embodiments includes an AC/DC converter device 1 (a first electric power supply) connected to a commercially available AC power supply PS, and configured to use electric power supplied from the outside as an input source; a heater control power supply 2 (heater electric power supply part) connected to the AC/DC converter device 1; a fixing device 3 (a heater) connected to the heater control power supply 2; a DC/DC converter device 4 (a load electric power supply part) connected in parallel with the heater control power supply 2 with respect to the AC/DC converter device 1; a constant voltage load 5 connected to the DC/DC converter device 4; and a rechargeable device (a second electric power supply) connected in parallel with the AC/DC converter device 1, and including a not-illustrated rechargeable battery to use an output of the rechargeable battery as an input source. Note that a reference number 6 in FIG. 1 indicates a DC internal bus (also referred to as a "DC electricity feeding bus") for supplying electric power. Further, the rechargeable device 7 includes a not-illustrated voltage converter configured to convert an output voltage of the rechargeable battery into a voltage of the DC interval bus 6.

The voltage of the AC commercially available power supply supplied to the electric power supply device is converted by the AC/DC converter device 1 into a voltage of the DC internal bus (a DC internal bus voltage). The AC/DC converter device 1 may be configured to further convert the output DC converted from the commercially available AC power supply by a power factor correction (PFC) circuit into the DC internal bus voltage. Further, in the AC/DC converter device 1, the maximum output electric power value may be set. In this case, the output of the AC/DC converter device in a normal status is lower than the maximum output electric power value, but is greater than the voltage of the rechargeable device 7. Note that the setting value of the maximum output electric power of the AC/DC converter device 1 is determined based on the maximum output current value because the output of the AC/DC converter device 1 is a constant voltage. In this case, an overcurrent setting value may be set by using a generally known integrated circuit (IC) having an overcurrent protection function to control a central processing unit (CPU) or a semiconductor device such as a transistor.

The heater control power supply 2 serves as an electric power supply configured to control electric power supplied from the DC internal bus 6 to a heater, that is, the fixing device 3. Note that the voltage supplied to the fixing device 3 may be alternating current (AC) or direct current (DC). The constant voltage load 5 serves as a load other than the fixing device of the image forming apparatus. An example of the constant voltage load 5 may include an actuator such as a motor that operates at 24 V, and sensors and a CPU that operate at 5 V or 3.3 V. The DC/DC converter device 4 is configured to convert the DC internal bus voltage into a DC voltage necessary for each of the loads. The rechargeable device 7 is connected to the DC internal bus 6, and is configured to charge or discharge the DC internal bus 6. The rechargeable device 7 may include at least one of a secondary battery or a capacitor, and at least one of a lithium ion battery, an electric double layer capacitor, a prompt polymer battery, and a nickel hydrogen battery.

Figure 2:
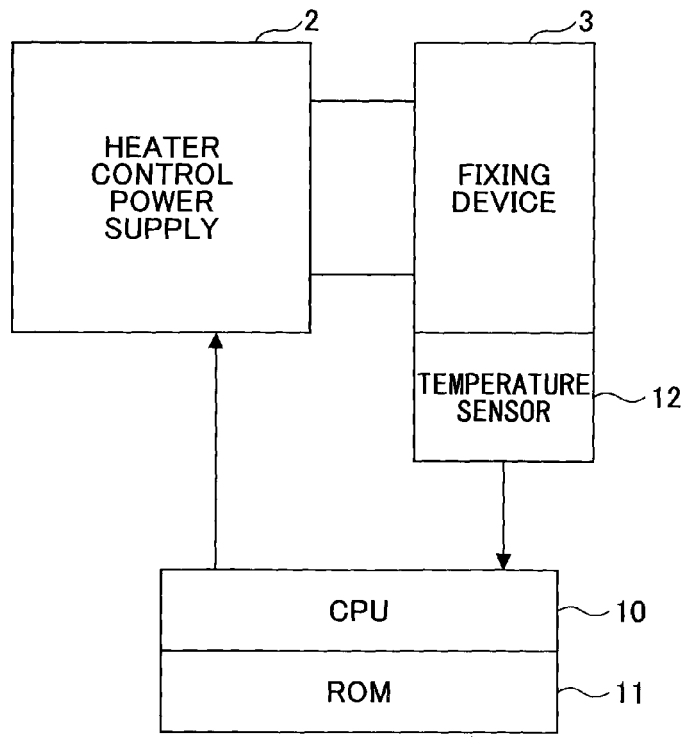
FIG. 2 is a block diagram illustrating a configuration of a heater mechanism of a fixing device.

FIG. 2 is a block diagram illustrating a configuration of a heater mechanism of the fixing device 3. The fixing device 3 includes a temperature sensor 12 configured to measure the temperature of the fixing device 3. The CPU 10 of the image forming apparatus reads a predetermined target temperature of the fixing device 3 in accordance with a printing status from a read-only memory (ROM) 11 to control the heater control power supply 2 while monitoring the output of the temperature sensor 12. The temperature of the fixing device 3 is thus controlled to be at the target temperature. The control content of the heater control power supply 2 includes control of the voltage value, and timing of electric power to be supplied to the fixing device 3.

First Embodiment

Figure 3:
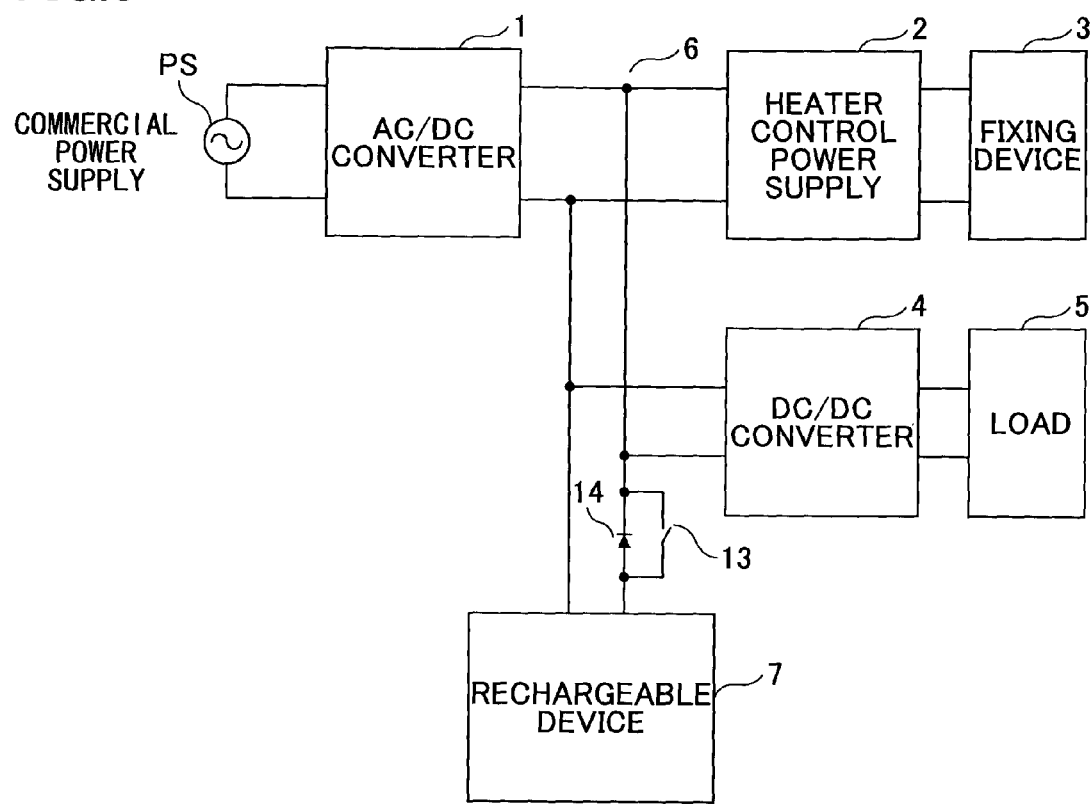
FIG. 3 is a block diagram schematically illustrating a configuration of an electric power supply device according to a first embodiment.

FIG. 3 is a block diagram schematically illustrating a configuration of an electric power supply device according to a first embodiment. The electric power supply device of the first embodiment includes a rechargeable device 7 that differs from that of the above-described electric power supply device. Other components of the electric power supply device of the first embodiment that are the same as those of the above-described electric power supply device are provided with the same reference numbers and duplicated descriptions are omitted from the specification. The rechargeable device 7 is connected to the heater control power supply 2 and the DC/DC converter device 4 via an on/off control device configured to on/off control electric power supply from the rechargeable device 7 to the DC internal bus, in this case, a diode 14 configured to be electrically conductive and supply electric power from the rechargeable device 7 to the DC internal bus along with a decrease in the DC internal bus voltage when the output electric power of the DC internal bus 6, the switch 13, and the AC/DC converter device 1 exceeds a predetermined maximum output electric power value. The rechargeable device 7 is configured to be charged in a period in which the image forming apparatus does not execute printing and thus the electric power consumption is small. When the rechargeable device 7 is being charged, the switch 13 is caused to be electrically conductive such that the rechargeable device 7 is charged from the DC internal bus 6 exhibiting a high voltage. A preferable example of the switch 13 includes a semiconductor switch such as a field effect transistor (FET) or an insulated gate bipolar transistor (IGBT), or a mechanical switch such as a relay. Further, when the switch 13 is open, the rechargeable device 7 will not be charged or discharged because the diode 14 is not electrically conductive.

Next, operations of the electric power supply device according to the first embodiment are described. That is, in the configuration of the electric power supply device illustrated in FIG. 3, it is assumed that the electric power consumption of the image forming apparatus before a certain time t1 is lower than the maximum output electric power value of the AC/DC converter device 1. At this time, the electric power consumed by the image forming apparatus is supplied from the AC/DC converter device 1 such that the voltage of the DC internal bus 6 is higher than the voltage of the battery 7.

Next, the electric power consumption of the image forming apparatus is greater than the maximum output electric power value of the AC/DC converter device 1 during an interval between time t1 and time t2. At this time, the voltage of the DC internal bus 6 is decreased because the output of the AC/DC converter device 1 is reduced. When the voltage of the DC internal bus 6 is decreased to be lower than a predetermined value, that is, a value obtained by the "voltage of the rechargeable device 7−Vf (a forward voltage of the diode 14)", the diode 14 becomes electrically conductive. Accordingly, the electric power consumption exceeding the maximum output electric power value is supplied from the rechargeable device 7, and the voltage of the DC internal bus 6 is obtained by the "voltage of the rechargeable device 7−Vf".

Thus, according to the first embodiment, when the output electric power of the AC/DC converter device 1 exceeds the maximum output electric power value, the diode 14 serving as a switching device becomes electrically conductive along with a decrease in the voltage of the DC internal bus to supply the electric power from the rechargeable device 7 to the DC internal bus. Hence, it may be possible to control the maximum electric power supply value supplied from the commercially available electric power supply PS to the image forming apparatus without incorporating a special device for monitoring the fixing device 3 of the image forming apparatus or the load other than the fixing device 3 of the image forming apparatus.

Second Embodiment

Figure 4:
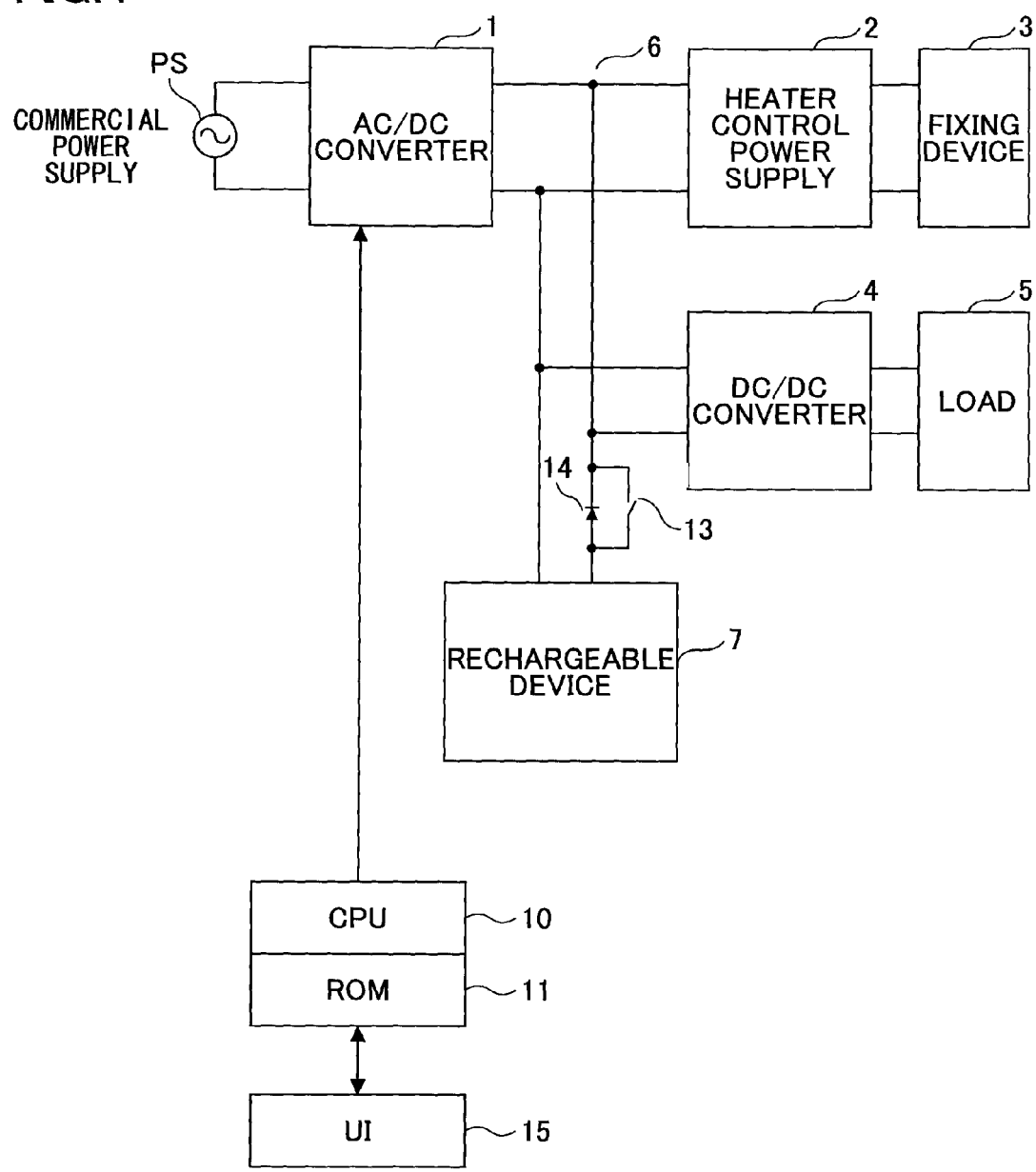
FIG. 4 is a block diagram schematically illustrating a configuration of an electric power supply device of an image forming apparatus according to a second embodiment capable of changing a maximum output electric power value of an AC/DC converter device by input from a user interface.

FIG. 4 is a block diagram schematically illustrating a configuration of an electric power supply device of an image forming apparatus according to a second embodiment capable of changing a maximum output electric power value of an AC/DC converter device by input from a user interface. The electric power supply device (i.e., an electric power supply circuit) of FIG. 4 further includes (adds), with respect to the AC/DC converter device 1 of the electric power supply device in the image forming apparatus according to the first embodiment illustrated in FIG. 3, a user interface 15 (an input device) configured to allow a user to supply output electric power of the AC/DC converter device 1, a storage device such as a ROM 11 configured to store the supplied output electric power value, and a setting device configured to read data from the storage device and set the maximum output electric power value of the AC/DC converter device 1, that is, a CPU 10. In this configuration, the user may be able to input via the user interface 15 an output electric power value of the AC/DC converter device 1 to change a setting value of the maximum output electric power value of the AC/DC converter device 1.

The input electric power from the commercially available power supply PS of the image forming apparatus is generally 1500 W. However, the electric power of 1500 W is not supplied from the commercially available power supply PS of the image forming apparatus under some setting environments, which does not allow installation of the image forming apparatus. However, the maximum output electric power value of the AC/DC converter device 1 may be set in the image forming apparatus of the second embodiment such that the input electric power is supplied from the commercially available AC power supply PS under such setting environments. An example of the user interface 15 includes an operations part provided with a liquid crystal panel.

Third Embodiment

Figure 5:
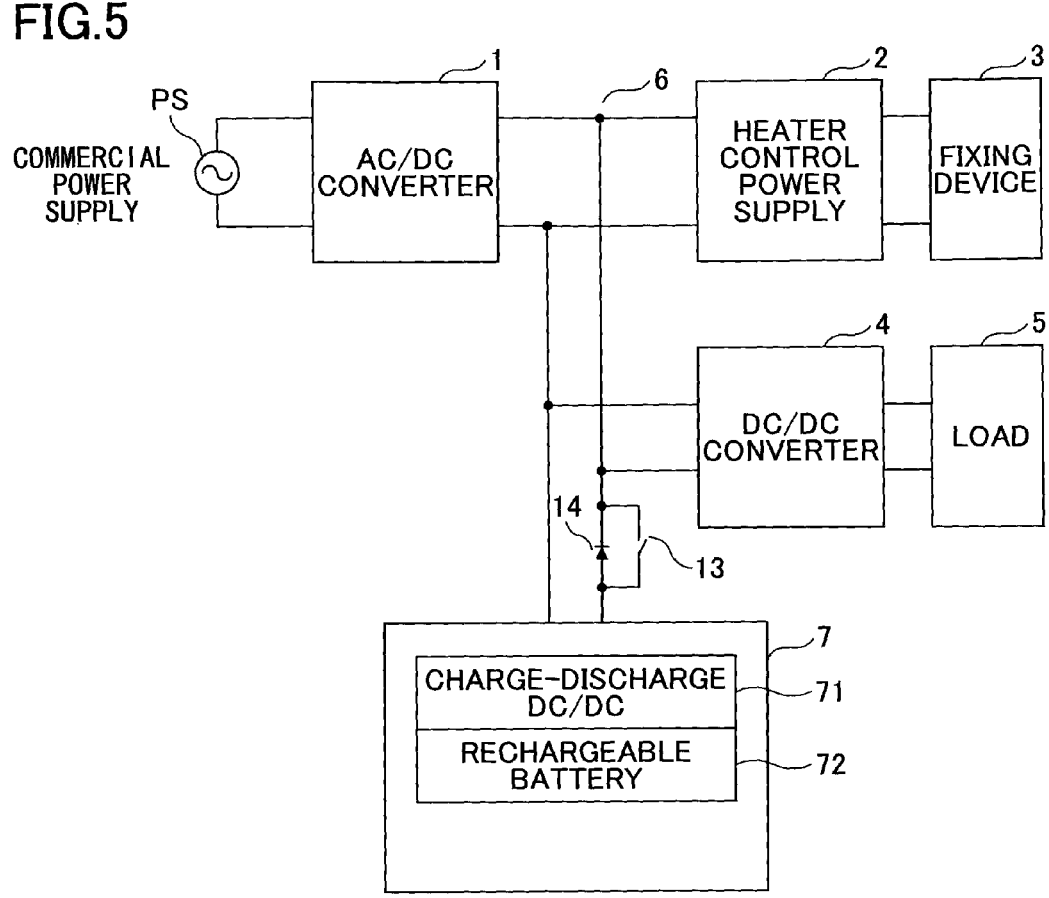
FIG. 5 is a diagram schematically illustrating a configuration of an electric power supply device according to a third embodiment that includes a charging or a discharging DC/DC converter device provided with a rechargeable device.

FIG. 5 is a diagram schematically illustrating a configuration of an electric power supply device according to a third embodiment that includes a charging or a discharging DC/DC converter device provided with a rechargeable device. That is, in the third embodiment, the rechargeable device 7 includes a charging or discharging DC/DC converter 71 serving as a voltage converter device, and a rechargeable battery 72. It may be necessary to set the voltage of the rechargeable device 7 higher than or equal to the voltage at which the heater control power supply 2 and the DC/DC converter device 4 are operable. However, in the third embodiment, the rechargeable device 7 may include a rechargeable battery 72 having a voltage higher than the voltage of the DC internal bus 6, or a rechargeable battery 72 having a voltage lower than or equal to the voltage at which the heater control power supply 2 and the DC/DC converter device 4 are operable.

In the third embodiment, when the electric power consumption exceeds the maximum output electric power value of the AC/DC converter device 1, the discharging DC/DC converter device 71 needs to be constantly operated so as to allow the rechargeable device 7 to immediately discharge. Note that the charging DC/DC converter device 71 may be operated when the rechargeable device 7 is charged. According to the above-described embodiments, the image forming apparatus includes the DC internal bus configured to supply electric power, the AC/DC converter device configured to convert the commercially available AC power supply voltage into the DC internal bus voltage, the rechargeable device directly connected to the DC internal bus, the heater control power supply configured to supply the DC internal bus voltage to the fixing device, and the DC/DC converter device configured to supply the DC internal bus voltage to the constant voltage load excluding the fixing device.

With this configuration, when the fixing device and other constant voltage loads require electric power greater than or equal to the maximum electric power value of the AC/DC converter device, a deficit in electric power may be automatically supplied from the rechargeable device by restricting the maximum output electric power value of the AC/DC converter device configured to convert the commercially available AC power supply voltage into the DC internal bus voltage. Hence, unlike the related art technology, the fixing control circuit does not need to include the adjusting circuit configured to control the limit level of the maximum output electric power value of the AC/DC converter device in accordance with a control status of the electric power supply from the commercially available power supply and the rechargeable device to the loads (constant voltage load) other than the heater, which may simplify the configuration of the fixing control circuit and reduce the manufacturing cost.

Fourth To Seventh Embodiments

An electric power supply device of an image forming apparatus according to fourth to seventh embodiments includes a rechargeable device in addition to an electric power supply that uses electric power constantly supplied from outside. In this electric power supply device, when high power electricity is required for operating an apparatus using electric power supply, the electric energy stored in the rechargeable device is supplied to the load to control the external input power of the apparatus not to exceed the suppliable power capacity of the electric power supply so as to level commercially available AC power consumption. In the following, a description is given, with reference to accompanying drawings, of the fourth to the seventh embodiments.

Figure 6:
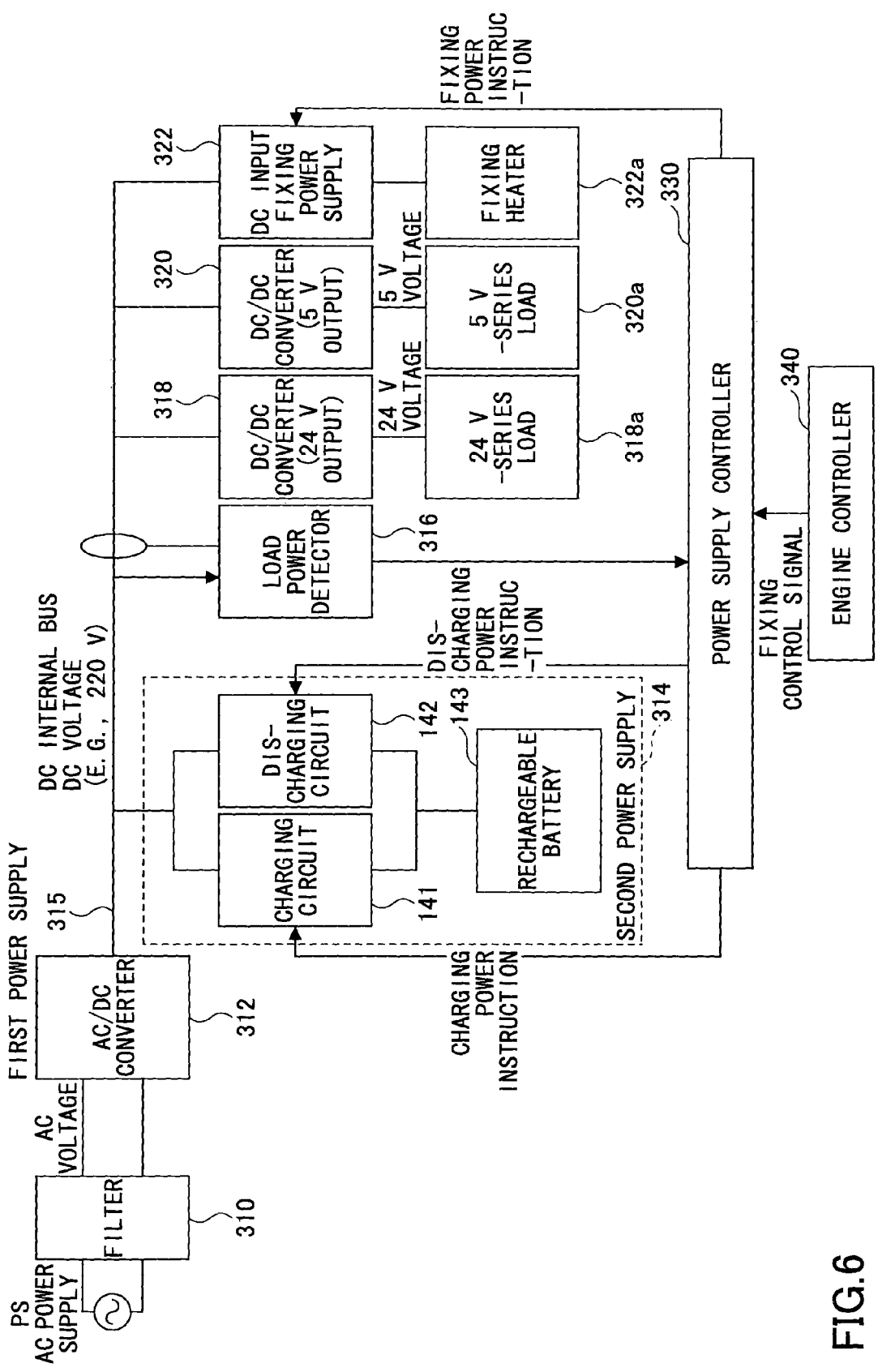
FIG. 6 is a block diagram illustrating an electric power supply device of an image forming apparatus according to a fourth embodiment.

FIG. 6 is a block diagram illustrating an electric power supply device of an image forming apparatus according to a fourth embodiment. The electric power supply device includes a first power supply 312 connected to an external AC power supply PS via a filter 310, a second power supply 314 including a charging circuit 141, a discharging circuit 142, and a rechargeable battery 143, and constant voltage load power supply parts (a DC/DC converter (24 V output) 318 and a DC/DC converter (5 V output) 320) and a DC input fixing power supply 322 corresponding to a constant voltage load (24 V-series load 318*a*, 5 V-series load 320*a*) and a fixing heater 322*a*.

The electric power supply device further includes a load power detector 316 configured to detect load power of the DC internal bus 315, and a power supply controller 330 configured to execute a fixing power instruction addressed to the DC input fixing power supply 322 based on a load power value detected by the load power detector, a charge/discharge power instruction addressed to the second power supply 314, and a fixing control signal from an engine controller 340.

The first power supply (an AC/DC converter) 312 is configured to output a constant voltage using externally supplied power (i.e., electric power from a commercially available AC power supply) as an input source. That is, a commercially available AC power supply input (electric power) is input into the AC/DC converter 312 via the filter 310. The AC/DC converter 312 may output a DC voltage (e.g., 220 V) based on the commercially available AC power supply input. The DC internal bus 315 (220 V) that receives the output DC voltage is connected to the constant voltage load power supply parts (the DC/DC converter (24 V output) 318, and the DC/DC converter (5 V output) 320) configured to supply power to the constant voltage load of the image forming apparatus, and the DC input fixing power supply 322 configured to supply electric power to the fixing heater 322*a*. A 24 V-series load 318*a*, a 5 V-series load 320*a*, and a fixing heater 322*a* are connected to the respective outputs of the constant voltage load power supply parts 318 and 320 and the DC input fixing power supply 322.

The engine controller 340 of the image forming apparatus, similar to the related art engine controller, includes a not-illustrated central processing unit (CPU), an image processing processor (IPP) configured to perform an image process, a read only memory (ROM) configured to store programs necessary for controlling copying and printing out, a random access memory (RAM) necessary for such control, and a non-volatile (NV)-RAM so as to mainly perform control of image formation. The engine controller 340 further includes a serial interface configured to transmit signals to or receive signals from a CPU that performs different controls so as to control I/O (inputs/outputs of a counter, a fan, a solenoid, a motor, etc.) connected to an engine control board.

The engine controller 340 supplies to the power supply controller 330 a fixing control signal for controlling a fixing temperature. The power supply controller 330 outputs a fixing power instruction to the DC input fixing power supply 322 based on the fixing control signal. The DC input fixing power supply 322 supplies, as illustrated in later depicted FIG. 8, power to the fixing heater 322a based on the fixing power instruction. The consumption power (load power) consumed by the 24 V-series load 318a, the 5 V-series load 320a, and the fixing heater 322a is detected by the load power detector 316. Note that since the DC voltage output is a constant voltage, the power is calculated by using a voltage value of a predetermined DC voltage (a constant voltage) output by substituting the current detection for the power detection.

Figure 7A:
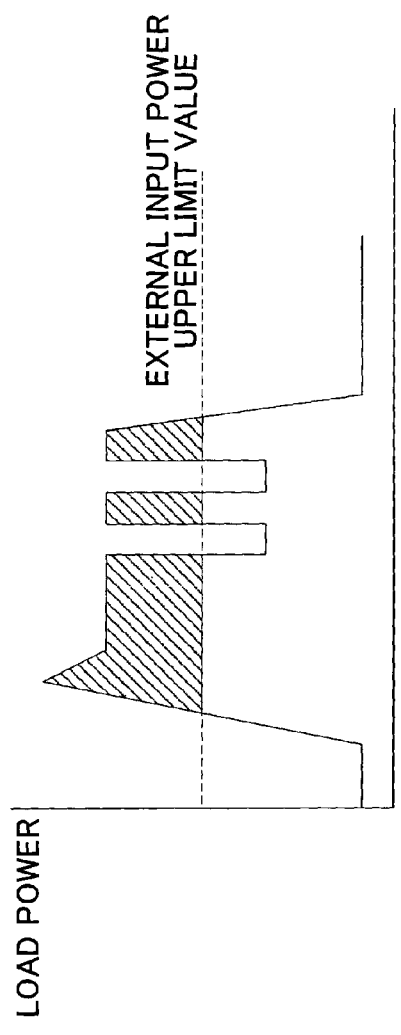
FIG. 7A is a diagram illustrating time varying load electric power (FIG. 7A) in the fourth embodiment.

Next, operations of the electric power supply device of the fourth embodiment is described with reference to FIGS. 7A to 7C. In the following, an illustration is given of a process of leveling external input power based on an output of the rechargeable battery 143. FIG. 7A illustrates time varying load power in the image forming apparatus of the fourth embodiment. The load power obtained by summing electric power of the 24 V-series load 318a, the 5 v-series load 320a, and the fixing heater 322a is small when the image forming apparatus is in a standby mode. However, when the image forming apparatus is in a printing mode, the fixing heater 322a may require high load power for heating a not-illustrated fixing roller to reach a required temperature. The power supply controller 330 heat-controls the fixing heater 322a for maintaining a temperature of the fixing roller at a required temperature for printing images on plural sheets, and returns the power level to the level in the standby mode when the printing is complete. When all the load power is supplied by using the external input power, high maximum power may be required. However, the image forming apparatus is not constantly printing, and spends a long time waiting for a printing instruction while consuming power in the standby mode. Hence, in the fourth embodiment, the upper limit value (a first threshold) of the external input power is set, and the power exceeding the upper limit value is supplied from the rechargeable battery 14 to the DC internal bus 315. That is, the external input power is leveled to the upper limit value or less by simultaneously supplying the power from the first power supply 312 and the power from the second power supply 314 to the load (the constant voltage loads (318a, 320a) and the fixing heater 322a).

Figure 7B:
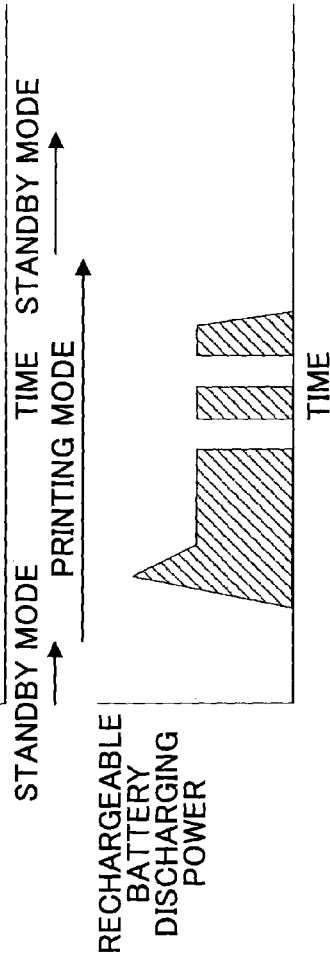
FIG. 7B is a diagram illustrating time varying power supplied from the rechargeable battery.

FIG. 7B is a diagram illustrating time varying power supplied from the rechargeable battery 143. In the fourth embodiment, the power supply controller 330 instructs the discharging circuit 142 of the rechargeable battery 143 to discharge power and supplies the power of the rechargeable battery 143 to the DC internal bus 315. In this case, there is a following relationship between the discharging power of the rechargeable battery 143 connected to the DC internal bus, the load power, and the external input power.

External input power=Load power−Rechargeable battery discharging power (1)

Note that the above formula (1) is satisfied by controlling the rechargeable battery discharging power not to exceed the load power. Hence, the discharging power of the rechargeable battery is instructed (controlled) to satisfy the following formula (2).

Rechargeable battery discharging power=Load power−Upper limit value of External input power (2)

Figure 7C:
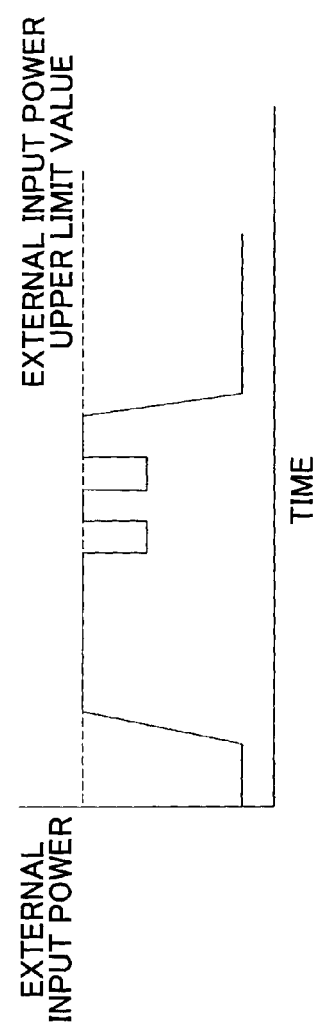
FIG. 7C is a diagram illustrating time varying external input power when discharging power of the rechargeable battery illustrated in FIG. 7B is supplied to the DC internal bus.

FIG. 7C is a diagram illustrating time varying external input power when the discharging power of the rechargeable battery illustrated in FIG. 7B is supplied to the DC internal bus 315. The relationship between the load power, the rechargeable battery discharging power, and the external input power is represented by the formula (1). The external input power illustrated in FIG. 7C will be the upper limit value or less of the external input power by implementing the discharging power instruction represented by the formula (2).

Figure 8:
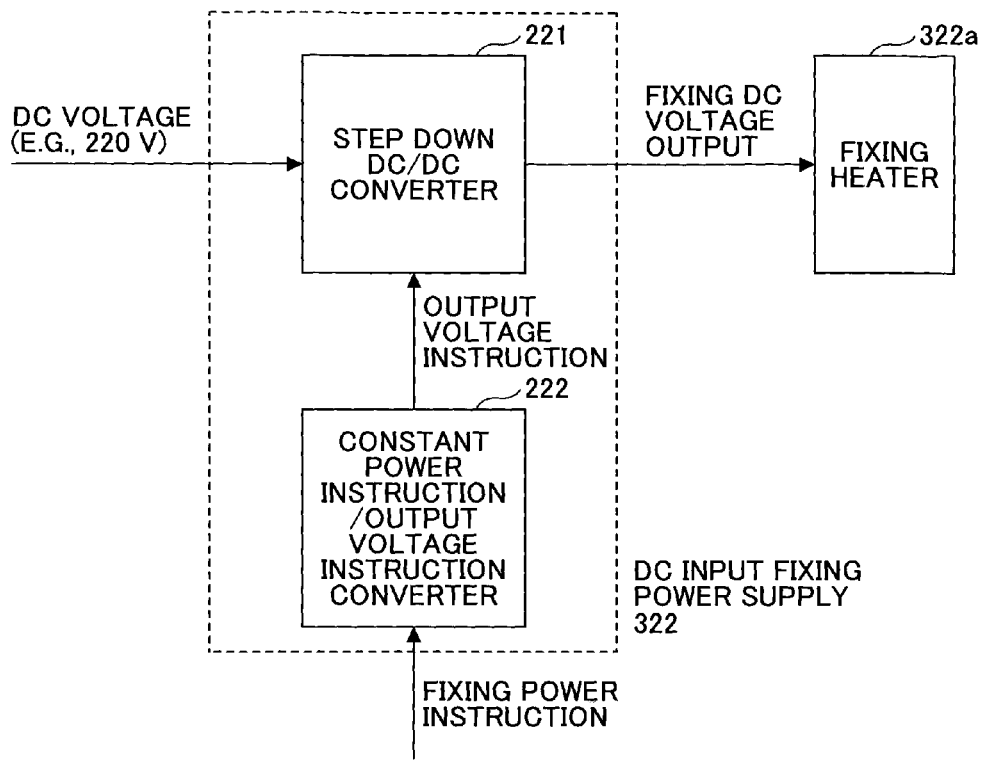
FIG. 8 is a block diagram illustrating a DC input fixing power supply.

FIG. 8 is a block diagram illustrating a DC input fixing power supply 322. The DC input fixing power supply 322 corresponds to the heater power supply part of the embodiment, and includes a step down DC/DC converter 221 and a constant power instruction/output voltage instruction converter 222. The step down DC/DC converter 221 outputs a DC voltage specified by the output voltage instruction based on the input DC voltage (e.g., 220 V) by using an output voltage instruction as a reference value input from the constant power instruction/output voltage instruction converter 222 based on the instruction from the power supply controller 330. The fixing DC voltage output of the step down DC/DC converter 221 varies with the change in the output voltage instruction.

The fixing DC voltage output is supplied to the fixing heater 322a to heat the fixing heater 322a. The higher the fixing DC voltage output is, the greater the power supplied to the fixing heater 322a is. That is, the heating of the fixing heater 322a is controlled by controlling the voltage value of the fixing DC voltage output.

Figure 9:
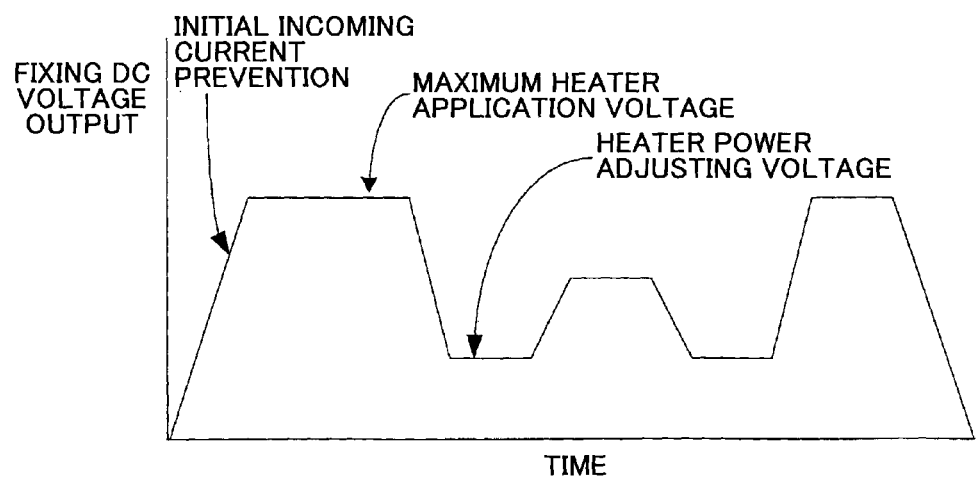
FIG. 9 is a diagram illustrating time varying the fixing DC voltage output serving as an output of the DC input fixing power supply, where a vertical axis represents a fixing power output and a horizontal axis represents time.

FIG. 9 is a diagram illustrating time varying fixing DC voltage output serving as the output of the DC input fixing power supply 322, where the vertical axis indicates the fixing DC voltage output and the horizontal axis indicates time. In the image forming apparatus, to startup the image forming apparatus from the standby mode to execute printing requires heating the fixing roller to a required temperature by applying the maximum voltage to the fixing heater 322a. In this case, when the fixing heater 322a is a halogen heater, the resistance of the unheated fixing heater 322a is low. Hence, in such a case, the fixing DC voltage output is changed in a ramp state to prevent (limit) initial incoming current as illustrated in FIG. 9.

After the fixing roller reaches the required temperature, the power is supplied to the fixing roller for maintaining the temperature. FIG. 9 illustrates the power supplied to the fixing heater 322a being controlled by controlling the output voltage of the DC input fixing power supply 322. The fixing heater 322a is controlled based on the fixing power instruction (signals) from the power supply controller 330. The input fixing power instruction is then converted by the constant power instruction/output voltage instruction converter 222 into an appropriate output voltage instruction. The relationship between the power supplied to the step down DC/DC converter 221 and the voltage output to the fixing heater 322a may be computed at this conversion time, or the computed results may be tabulated as data in a table in advance.

Note that the step down DC/DC converter 221 is generally known as having a simple configuration to implement voltage. Further, the power is supplied to the fixing heater 322a using the step down DC/DC converter 221. Hence, the DC voltage input to the step down DC/DC converter 221 needs to be set at a voltage higher than the maximum voltage applied to the fixing heater 322a.

In the electric power supply illustrated in FIG. 6, desired DC power is generated by converting the AC voltage of the commercially available AC power supply PS. The function of the AC/DC converter 312 may be implemented by an AC/DC converter (PFC circuit) combined with power factor correction (PFC) in the image forming apparatuses that generally consume a large amount of power. The function of the AC/DC converter 312 may be implemented by a fullwave rectifying circuit in the image forming apparatuses that generally consume a small amount of power. Note that when the PFC circuit is used, the DC internal bus voltage is set based on its input voltage and the boosting ratio.

The power supply controller 330 determines whether the load power detected by the load power detector 316 exceeds the upper limit value of the external input power based on the value input to the load power detector 316. Note that when the load power exceeds the upper limit value of the external input power, the computation of the formula (2) is performed within the power supply controller 330, and the computed result is then output as a discharging power instruction. The discharging power instruction is input in the discharging circuit 142 connected to the rechargeable battery 143. The discharging circuit 142 discharges based on the discharging power instruction supplied, and supplies the power of the rechargeable battery 143 to the DC internal bus 315.

Specifically, the discharging circuit 142 outputs a constant current by using a current value (Current=Discharging power instruction/Voltage value of the DC internal bus 315) corresponding to the discharging power. As a result, since the external input power is reduced by the discharging power of the rechargeable battery as illustrated by the formula (1), the external input power is the upper limit value or less of the external input power. Note that an allowable range of the upper limit value of the external input power may be increased in order not to allow the external input power to exceed a predetermined power. This may be represented by the following formula (3).

$$\text{Upper limit value of the external input power} = \text{Predetermined limit of the external input power} - \text{Allowable power} \quad (3)$$

The allowable power may be effective when the discharging power from the rechargeable battery 143 is supplied to the DC internal bus 315 with delay.

In the electric power supply of FIG. 6, the DC voltage of the DC internal bus 315 is 220 V. The DC input fixing power supply 322 uses the step down DC/DC converter 221 as illustrated in FIG. 8. Hence, the DC voltage (input voltage) of the DC internal bus 315 needs to be higher than the maximum application voltage of the fixing heater 322a. For example, the DC voltage of the DC internal bus 315 needs to be set at 100 V or higher when the fixing heater 322a having a rated voltage of 100 V is used. On the other hand, the voltage of the rechargeable battery may generally be 48 V or 24 V. Hence, the difference from the fixing DC voltage output is large, and a voltage conversion ratio of the DC/DC converter in the charging circuit 141 or the discharging circuit 142 is increased, which may result in an increase in the circuit size and degradation of the conversion efficiency. Hence, the DC voltage of the DC internal bus 315 is selected as the maximum application voltage of the fixing heater 322a.

Further, when the PFC circuit is used as the AC/DC converter 312, a step-up type PFC is generally used. Hence, the voltage to be used may be selected based on the input voltage of the AC power supply and the boosting ratio determined by the type of the PFC. Note that the rechargeable battery 143 may be charged by receiving a charging power instruction from the power supply controller 330 when the value of the load power detector 316 with the image forming apparatus being in a standby mode is lower than a certain threshold (a second threshold). Further, a not-illustrated timer function may be provided with the power supply controller 330, and may output the charge power instruction to charge the rechargeable battery 143 at midnight when a lower electricity rate is applied.

Figure 10:
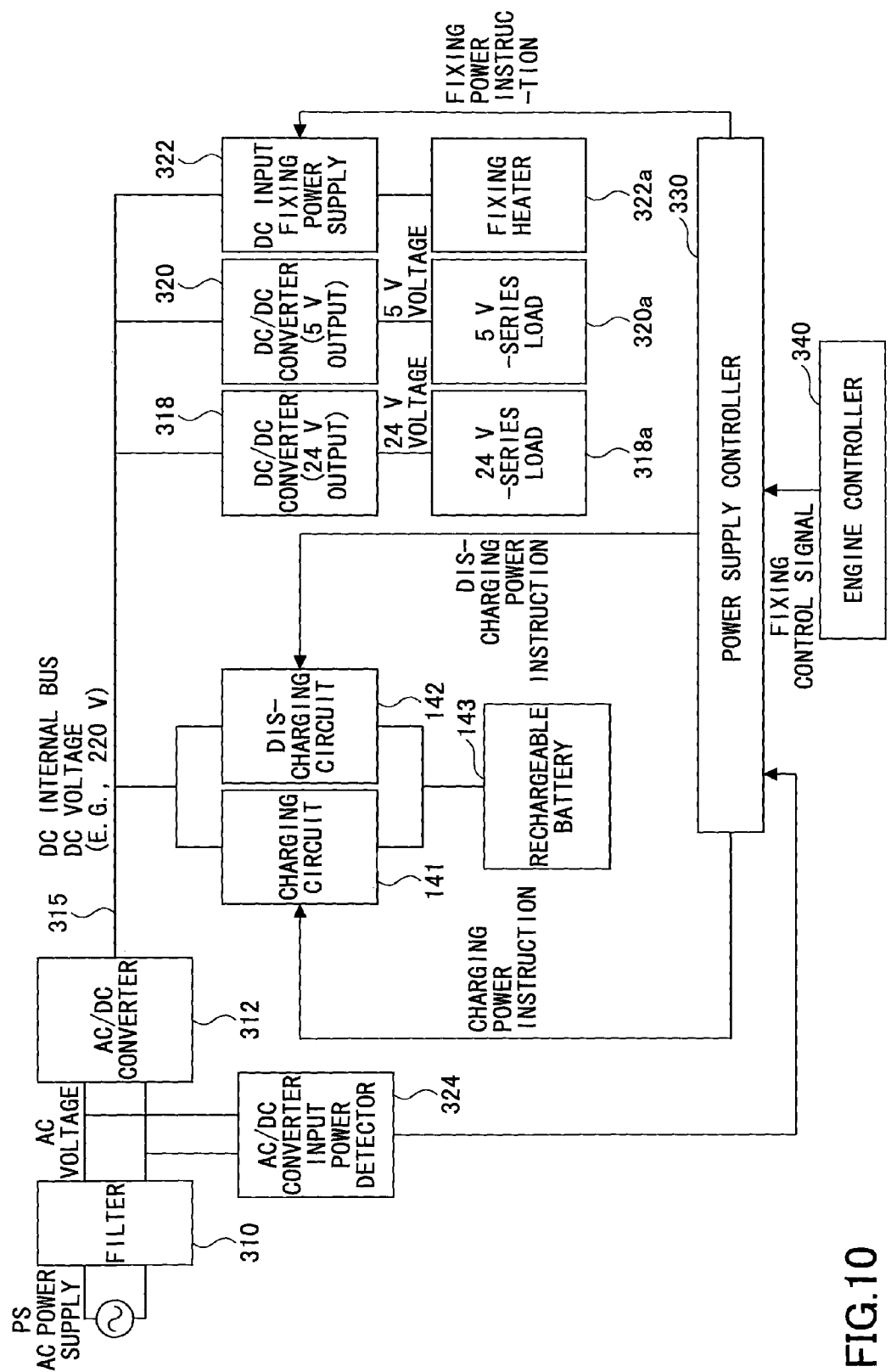
FIG. 10 is a block diagram illustrating an electric power supply device of an image forming apparatus according to a fifth embodiment.

FIG. 10 is a block diagram illustrating an electric power supply device of an image forming apparatus according to a fifth embodiment. The fifth embodiment in FIG. 10 differs from the electric power supply device of the fourth embodiment illustrated in FIG. 6 in that the load power detector 316 is omitted, and an AC/DC converter input power detector 324 configured to detect input power of the AC/DC converter 312 is disposed in parallel with the AC/DC converter 312 with respect to the filter 310, and other components and the configuration are similar to the electric power supply device of the fourth embodiment illustrated in FIG. 6. Hence, the components of the fifth embodiment similar to those of the fourth embodiment are provided with the same reference numbers and a duplicated illustration is omitted from the specification.

In the fifth embodiment, the discharging power instruction supplied by the power supply controller 330 to the discharge circuit 142 is controlled such that the input power detected by the AC/DC converter input power detector 324 is equal to the upper limit value (the first threshold) of the external input power set. Specifically, the discharging instruction is determined by amplifying the difference between the input power of the AC/DC converter 312 detected by the AC/DC converter input power detector 324 and the upper limit value of the external input power set by using the discharging power instruction supplied by the power supply controller 330 as a reference value. Hence, feedback control is performed. Although not illustrated in the figure, the computation for the feedback process is performed by the power supply controller 330.

Figure 11:
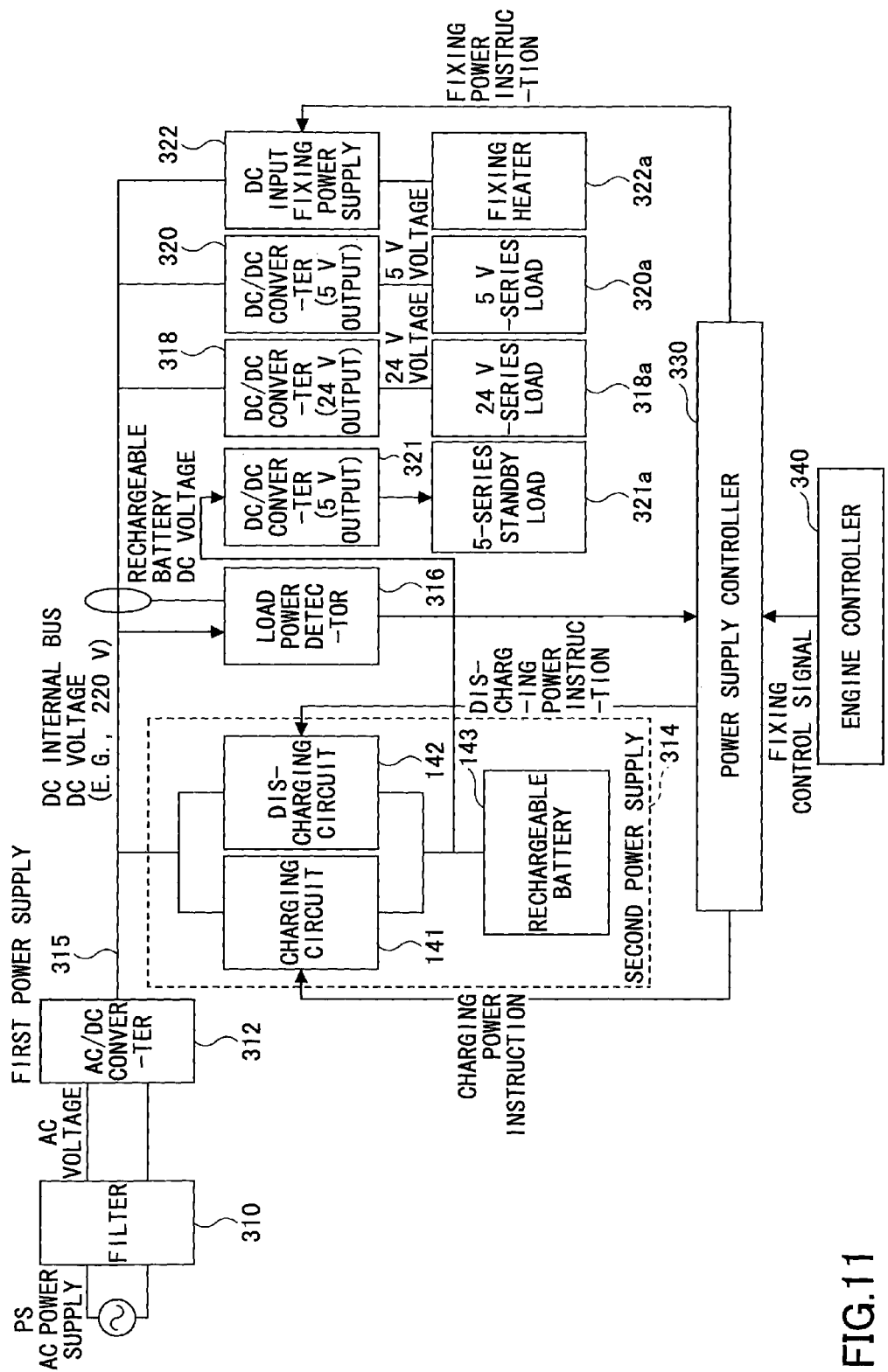
FIG. 11 is a block diagram illustrating an electric power supply device of an image forming apparatus according to a sixth embodiment.

FIG. 11 is a block diagram illustrating an electric power supply device of an image forming apparatus according to a sixth embodiment. In the sixth embodiment in FIG. 11, the power is supplied from the rechargeable battery 143 to the 5 V-series standby load 321a alone for which operations are required in the standby mode where the image forming apparatus is waiting for execution of printing. Hence, a DC/DC converter (5 V output) 321 is connected to the rechargeable battery 143. The DC/DC converter (5 V output) 321 is an example of a second constant voltage load power supply part having the maximum output voltage less than that of the constant voltage load power supply part (DC/DC converter (24 V output) 318, (DC/DC converter (5 V output) 320). The above feature of the electric power supply device of the sixth embodiment differs from that of the fourth embodiment, and other components and the configuration are similar to the electric power supply device of the fourth embodiment. Hence, the components of the sixth embodiment similar to those of the fourth embodiment are provided with the same reference numbers and a duplicated illustration is omitted from the specification.

The DC/DC converter (5 V output) 321 is configured to convert the output voltage of the rechargeable battery 143 such as 48 V or 24 V into 5 V, and supplies the converted power to the 5 V-series standby load 321a. As a result, the power supplied to a block of the AC/DC converter 312 (a block receiving electric power from the AC/DC converter 312) may be stopped when the image forming apparatus is in the standby mode. Thus, electric power supply to the block that does not require electric power in the standby mode is cut off and the external input power may be switched to 0 W. For example, the standby power may be switched to 0 W when the image forming apparatus is in the standby mode at night.

Figure 12:
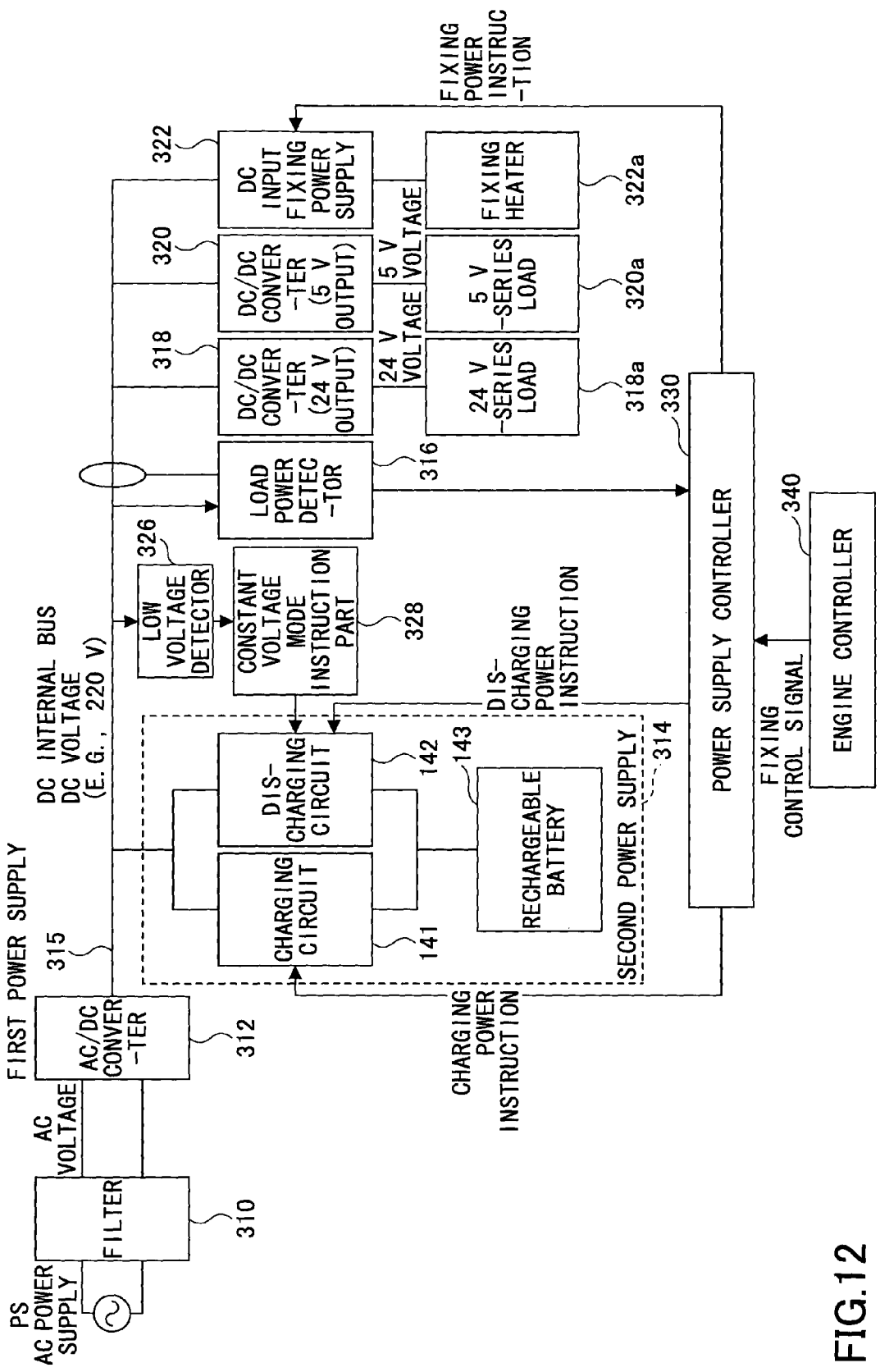
FIG. 12 is a block diagram illustrating an electric power supply device of an image forming apparatus according to a seventh embodiment.

FIG. 12 is a block diagram illustrating an electric power supply device of an image forming apparatus according to a seventh embodiment. The electric power supply device of the seventh embodiment in FIG. 12 differs from that of the fourth embodiment in that the electric power supply device of the seventh embodiment further includes (i.e., in addition to the components of the fourth embodiment) a low voltage detector 326 serving as an example of a voltage detector configured to detect the voltage of the DC internal bus 315 and outputs a signal when the detected voltage reaches a predetermined voltage (a third threshold) or less, and a constant voltage mode instruction part 328 configured to change a control mode of the discharging circuit 142 based on the signal from the low voltage detector 326. Other components and the configuration in the seventh embodiment are similar to the electric power supply device of the fourth embodiment. Hence, the components of the seventh embodiment similar to those of the fourth embodiment are provided with the same reference numbers and a duplicated description is omitted from the specification.

Figure 13:
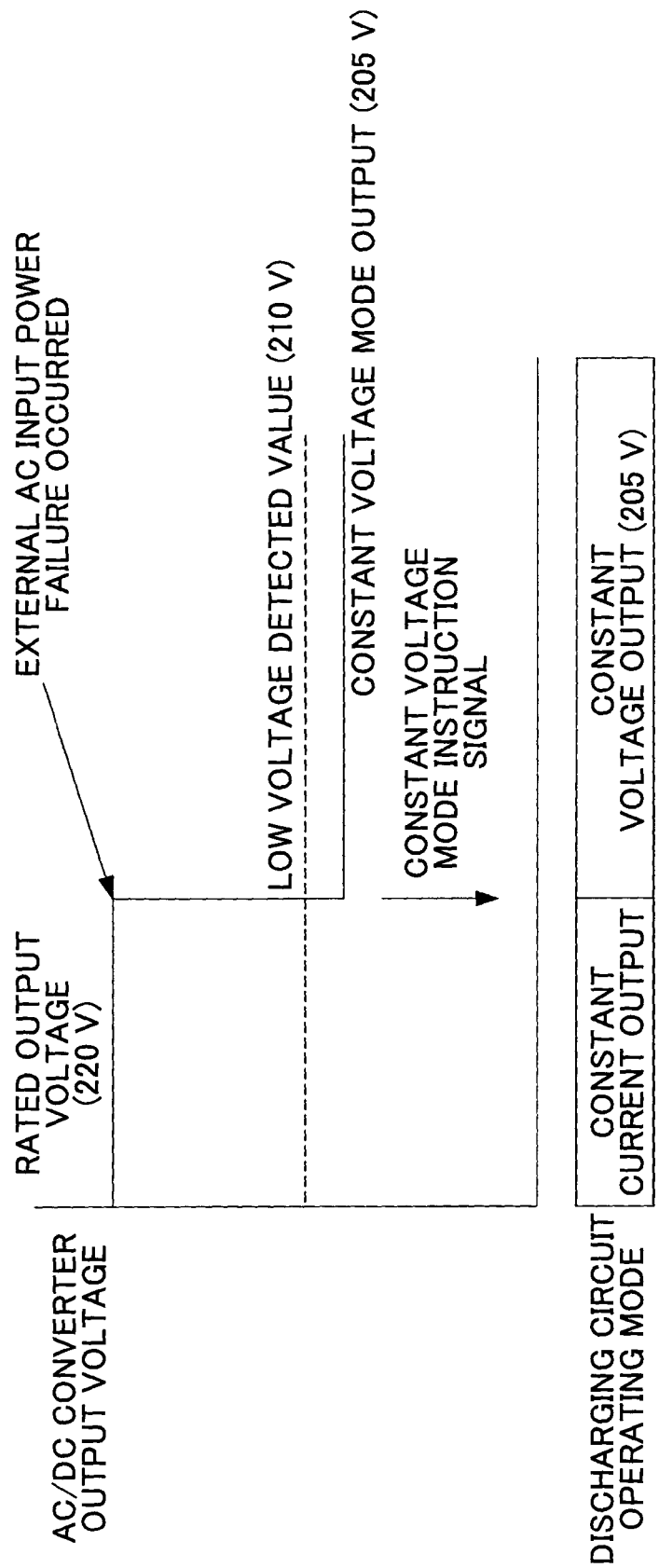
FIG. 13 is a diagram illustrating operations of the electric power supply device according to the seventh embodiment.

FIG. 13 is a diagram illustrating operations of the electric power supply device according to the seventh embodiment. The voltage of the DC internal bus 315 is determined based on the output voltage of the AC/DC converter 312. A rated output voltage (the DC voltage 220 V in this case) set at the output voltage of the AC/DC converter 312 is generally output. As a result, when an electrical outage has occurred in the external AC power supply PS, the output voltage of the AC/DC converter 312 is decreased. The decrease in the output voltage of the AC/DC converter 312 is determined based on the capacitance of an output capacitor of the AC/DC converter 312 and load power. However, the output voltage of the AC/DC converter 312 is sharply decreased such that the output voltage of the AC/DC converter 312 falls below the input voltage range in which the DC/DC converter 318 configured to output 24 V, the DC/DC converter 320 configured to output 5 V, and the DC input fixing power supply 322 configured to drive the fixing heater 322a normally operate.

In the seventh embodiment, when the detected voltage falls below the low voltage detection value (210 V in this case) of a predetermined voltage (a third threshold), the low voltage detector 326 outputs a detection signal. This detection signal is input to a constant voltage mode instruction part 328 configured to change a control mode of the discharging circuit 142. The constant voltage mode instruction part 328 sets an operating mode of the discharging circuit 142 in a normal state as a constant current output and performs constant current control to discharge the power to the DC internal bus 315 in accordance with the specified discharging power instruction. However, when the detection signal of the low voltage detector 326 is input in the constant voltage mode instruction part 328, the constant voltage mode instruction part 328 outputs a constant voltage mode instruction signal to the discharging circuit 142. On receiving the constant voltage mode instruction signal, the discharging circuit 142 shifts from the constant current control mode to the constant voltage control mode, and discharges power so as to maintain a predetermined constant voltage (a constant voltage mode output of 205 V in this case). Hence, even when the electrical outage has occurred, a predetermined constant voltage (205 V) is supplied from the rechargeable battery 143 to the DC internal bus 315 such that the DC internal bus 315 may be able to perform backup operations for the electrical outage.

Note that the low voltage detection value may need to be set at a value higher than that of the constant voltage mode output voltage. Further, the constant voltage mode output voltage may need to be set at a value higher than an input voltage range in which the DC/DC converter 318 connected to the DC internal bus 315 and configured to output 24 V, the DC/DC converter 320 configured to output 5 V, and the DC input fixing power supply 322 configured to drive the fixing heater 322a normally operate.

As described above, according to the fourth to seventh embodiments, the power in the standby mode may be reduced to 0 W by supplying the power from the rechargeable battery 143 to the 5 V-series standby load 321a that requires operations in the standby mode. Further, even when the electrical outage has occurred, a predetermined constant voltage is supplied from the rechargeable battery 143 to the DC internal bus 315 such that the DC internal bus 315 may be able to perform backup operations for the electrical outage.

The present application is based on and claims the benefit of Priority of Japanese Patent Application No. 2014-005162 filed Jan. 15, 2014, and Japanese Patent Application No. 2014-008982 filed Jan. 21, 2014, the entire contents of which are hereby incorporated herein by reference.

DESCRIPTION OF THE REFERENCE NUMERALS

1 AC/DC converter device
2 heater control power supply
3 fixing device
4 DC/DC converter device
5 load (constant voltage load)
6 DC internal bus
7 rechargeable device
10 CPU
11 ROM
12 temperature sensor
13 switch
14 diode
15 user interface (UI)
141 charging circuit
142 discharging circuit
143 rechargeable battery
221 step down DC/DC converter
222 constant power instruction/output voltage instruction converter
310 filter
312 first power supply (AC/DC converter)
314 second power supply
315 DC internal bus
316 load power detector
318 DC/DC converter (24 V output)
318a 24 V-series load
320 DC/DC converter (5 V output)
320a 5V-series load
322 DC input fixing power supply
322a fixing heater
324 AC/DC converter input power detector
326 low voltage detector
328 constant voltage mode instruction part
330 power supply controller
340 engine controller

RELATED ART DOCUMENTS

Patent Documents

Patent Document 1: Japanese Laid-open Patent Publication No. 2005-221677

Patent Document 2: Japanese Laid-open Patent Publication No. 2007-209149

The invention claimed is:

1. An electric power supply device comprising:
    a first electric power supply to receive electric power supplied from outside as an input source;
    a second electric power supply including a rechargeable battery as an input source;
    a load electric power supply, different from the first electric power supply and different from the second electric power supply, to supply electric power at a constant voltage to a load;
    a heater electric power supply to supply electric power to a heater;
    a DC internal bus connected to the first electric power supply, the second electric power supply, the load electric power supply, and the heater electric power supply; and
    a controller configured to control an output of the second electric power supply, wherein the controller controls electric power supply from the second electric power supply to the DC internal bus based on a voltage of the DC internal bus.

2. The electric power supply device as claimed in claim 1, wherein the controller supplies electric power from the second electric power supply to the DC internal bus when the voltage of the DC internal bus is lower than a threshold.

3. The electric power supply device as claimed in claim 1, further comprising:
    an input to input output electric power of the first electric power supply, wherein the output electric power input to the input is set as a maximum output electric power value of the first electric power supply.

4. The electric power supply device as claimed in claim 1, wherein the controller is formed of a diode.

5. The electric power supply device as claimed in claim 4, further comprising:
    a switch connected in parallel with the diode, and to cause the second electric power supply and the DC internal bus to be conductive when the second electric power supply is charged.

6. The electric power supply device as claimed in claim 1, further comprising:
    a voltage converter to convert an output voltage of the rechargeable battery into a voltage of the DC internal bus.

7. The electric power supply device as claimed in claim 1, wherein the rechargeable battery includes at least one of a secondary battery and a capacitor.

8. The electric power supply device as claimed in claim 1, wherein the rechargeable battery includes at least one of a lithium ion battery, an electric double layer capacitor, a pronto polymer battery, and a nickel hydrogen battery.

9. The electric power supply device as claimed in claim 1, further comprising:
    a load electric power detector to detect load electric power of the DC internal bus, wherein when the load electric power detected by the load electric power detector exceeds a threshold, the controller supplies an exceeded amount of electric power from the second electric power supply to the DC internal bus.

10. The electric power supply device as claimed in claim 9, further comprising:
    an input electric power detector to detect input electric power input from outside to the first electric power supply, wherein the controller controls an output of the second electric power supply such that the input electric power detected by the input electric power detector is equal to the threshold.

11. The electric power supply device as claimed in claim 9, further comprising:
    a second load electric power supply to have a maximum output voltage lower than that of the load electric power supply, wherein the controller controls the second electric power supply such that electric power is supplied from the second electric power supply to the second load electric power supply when the electric power supply device is in a standby mode.

12. The electric power supply device as claimed in claim 9, wherein the controller controls the second electric power supply such that the second electric power supply is charged when the load electric power detected by the load electric power supply is lower than another threshold.

13. The electric power supply device as claimed in claim 9, further comprising:
    a voltage detector to detect a voltage of the DC internal bus, wherein when the voltage detected by the voltage detector is lower than another threshold, electric power is supplied to the DC internal bus based on a constant voltage output from the second electric power supply by switching the second electric power supply from a constant current control mode to a constant voltage control mode.

14. The electric power supply device as claimed in claim 13, wherein said another threshold is set at a voltage higher than a voltage for normally operating the load electric power supply and the heater electric power supply.

15. The electric power supply device as claimed in claim 1, wherein the heater electric power supply includes a step-down DC/DC converter.

16. The electric power supply device as claimed in claim 15, wherein the voltage of the DC internal bus is set at a voltage higher than a maximum heater application voltage.

17. The electric power supply device as claimed in claim 15, wherein the first electric power supply forms a PFC circuit, and the voltage of the DC internal bus is set based on an input voltage and a boosting ratio of the PFC circuit.

18. An image forming apparatus comprising the electric power supply device as claimed in claim 1.

19. The electric power supply device as claimed in claim 1, wherein the load electric power supply includes a down DC/DC converter.

20. An electric power supply device comprising:
    a first electric power supply to receive electric power supplied from outside as an input source;
    a second electric power supply including a rechargeable battery as an input source;
    a load electric power supply, different from the first electric power supply and different from the second electric power supply, to supply electric power at a constant voltage to a load;
    a heater electric power supply to supply electric power to a heater;
    a DC internal bus connected to the first electric power supply, the second electric power supply, the load electric power supply, and the heater electric power supply; and
    a controller configured to control an output of the second electric power supply, wherein the controller controls electric power supply from the second electric power supply to the DC internal bus based on a voltage of the DC internal bus;

wherein the controller supplies electric power from the second electric power supply to the DC internal bus when the voltage of the DC internal bus is lower than a threshold.

21. The electric power supply device as claimed in claim 20, further comprising:
an input configured to input output electric power of the first electric power supply, wherein the output electric power input to the input is set as a maximum output electric power value of the first electric power supply.

* * * * *